March 30, 1954  A. W. TRONNIER  2,673,491
PHOTOGRAPHIC OBJECTIVE COMPRISING FOUR LENS MEMBERS
SEPARATED BY AIR SPACES AND ENCLOSING THE DIAPHRAGM
Filed Sept. 7, 1951
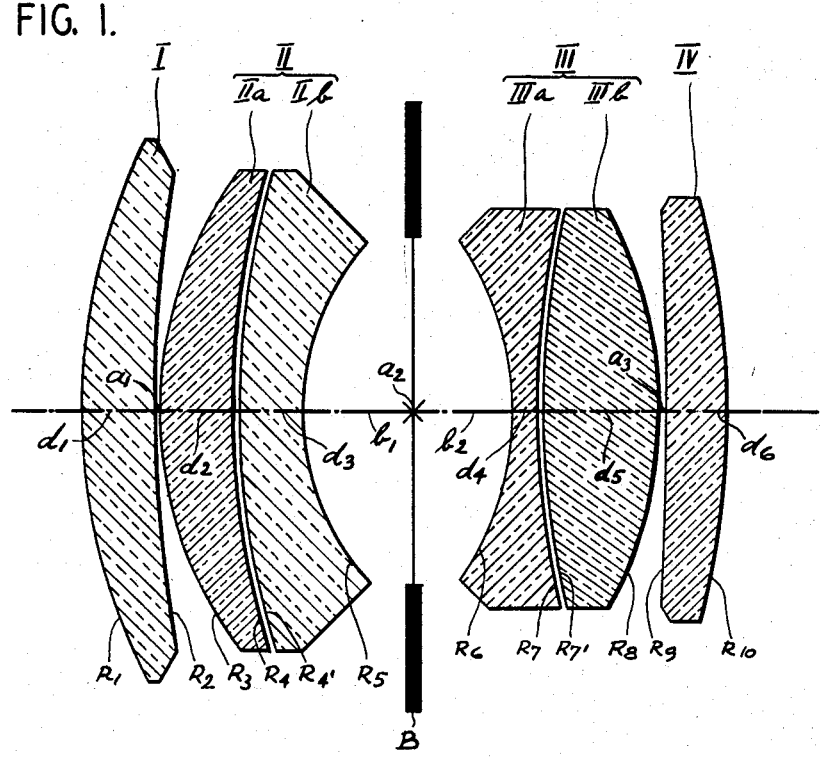
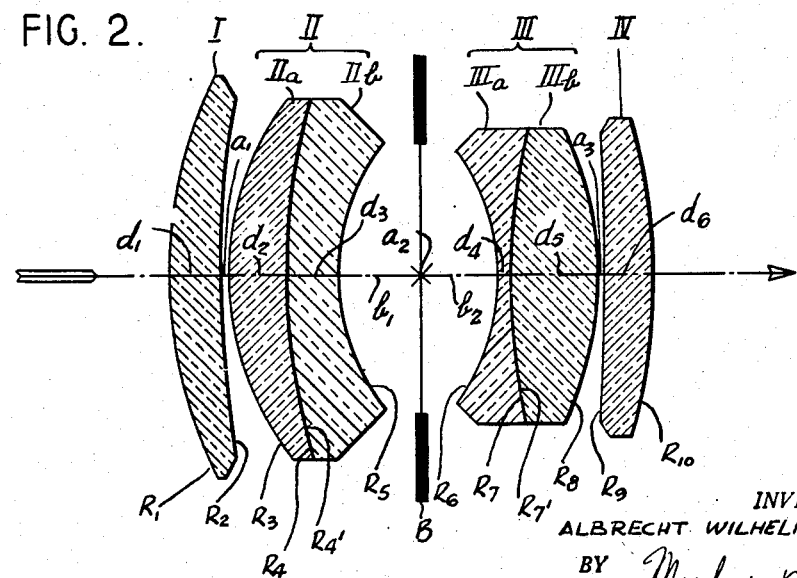
INVENTOR.
ALBRECHT WILHELM TRONNIER
BY Mack + Blum
ATTORNEYS.

Patented Mar. 30, 1954

2,673,491

UNITED STATES PATENT OFFICE 2,673,491

PHOTOGRAPHIC OBJECTIVE COMPRISING FOUR LENS MEMBERS SEPARATED BY AIR SPACES AND ENCLOSING THE DIAPHRAGM

Albrecht Wilhelm Tronnier, Gottingen, Germany, assignor to Voigtlander A. G., Braunschweig, Germany, a corporation of Germany Application September 7, 1951, Serial No. 245,440

Claims priority, application Switzerland September 14, 1950

4 Claims. (Cl. 88—57)

This invention relates to a new and improved objective of the Gauss-type. More particularly, the invention relates to a Gauss-type objective comprising four individual structural lens units separated by air spaces, two of said units being arranged on each side of a central air space serving as the diaphragm space.

It is one object of the present invention to provide an objective by which a large field of view can be illuminated even at large relative apertures, and with the good image quality of Gauss-type objectives having single outer lenses.

Other objects and the advantages of the invention will be apparent from the appended claims and drawings and the following specification which describes by way of example some embodiments of the invention.

In the objectives embodying the present invention, the central diaphragm is enclosed on both sides by strongly curved concave lens surfaces, and the two lens units (II and III) enclosing the diaphragm, consist each preferably of two individual lens elements of opposite power.

In order to attain the objects of my invention, the glasses of the lenses forming the objective are selected in such manner that, on the one hand, the arithmetical mean of the refractive indices of the glasses of all collecting lenses, is distinctly higher than 1.66, and, on the other hand, simultaneously, the diverging lens following the diaphragm on the side of the shorter conjugate is arranged at the point of strongest constriction of rays—with reference to the auxiliary ray—and consists of a glass, the mean refractive index of which for yellow light, is distinctly smaller than 1.63 and is, simultaneously, by distinctly more than 0.050 smaller than the before mentioned arithmetical mean of all converging lenses for light of the same color.

Furthermore, I have found that particularly good results are obtained if the lens elements following the diaphragm on the side of the shorter conjugate, consist of glasses which have refractive indices increasing from the diaphragm in the direction of the light rays in such manner that the difference between the refractive indices for yellow light of two adjacent lenses is in each case clearly or distinctly higher than 0.0375.

I have found that such relation of the refractive indices of lens elements following the diaphragm on the side of minor conjugate, in combination with the above described fundamental, new selection of glasses, results in a substantial improvement of the image quality, particularly with regard to correction for coma. This improvement can be further enhanced by selecting and arranging the lengths of radii of curvature within the total system of the objective in such manner that the sum of the two radii, $R_8$ and $R_{10}$, of the two strongly collecting outer lens surfaces which limit the two structural members (III and IV) of the system, are concave relative to the diaphragm and follow the latter in the rear part of the lens system, i. e. on the side of the minor conjugate, is distinctly higher than 180% of the length of radius of curvature $R_1$ of the outer limiting lens surface, which is likewise concave relative to the diaphragm, said radius $R_1$ being denoted the front radius of the total objective, in the meaning of the photographic picture.

In the appended drawings, Figure 1 illustrates the general structure of an objective embodying the present invention in vertical axial section taken along its optical axis. The horizontal optical axis is indicated by a dash and dot line. The object space is at the left of the objective and the image space is at the right of the objective in the drawing, and the direction of the light is from left to right. Figure 1 also illustrates the reference symbols used hereinafter.

Figure 2 illustrates a modification of my invention, in which inner members II and III of the objective consist of cemented lenses. This objective, which is illustrated in conventional manner in axial section, is contemplated for photographic pictures and has a relative aperture of 1:2, at which the total illumination covers a field of 60° with reference to the picture of a remote object.

In the following disclosure and the drawings, certain symbols are used, which are identified as follows: The lens members forming the objective are denoted I, II, III and IV. Lens member II comprises two lens element IIa and IIb and lens member III comprises lens elements IIIa and IIIb. Lens members I and II are arranged on the side of the major conjugate and lens members III and IV are located on the side of the minor conjugate. The radii of curvature of the lens surfaces are denoted by reference symbol $R$, the axial thickness of the lenses by $d$ and the axial thickness of the air spaces $a$, and these symbols are consecutively numbered from left to right, i. e. in the direction of the light. The radii of adjacent surfaces of the lens elements in lens group II and III, are denoted $R_4$, $R_4^1$ and $R_7$, $R_7^1$, respectively. The radii of curvature of the lens surfaces are denoted $R_1$, $R_2$ ... $R_{10}$; the axial thickness of the lenses is denoted by $d_1, d_2 ... d_6$ and the axial thickness of the air spaces $a_1$, $a_2$ and $a_3$. The refractive indices $n_1$ and $f$ of the lens glasses are stated for the yellow light of helium line $d$ of a wave length of 5876 AE, while the color dispersion of these glasses is characterized by the numerical value of their Abbe number $v$. The diaphragm arranged between the inner lens members II and III is denoted by reference numeral B. $b_1$ and $b_2$ denote the axial distance of the diaphragm from the composite lens group II on the side of the major conjugate and from the composite lens group or member III, on the side of the minor conjugate, respectively. The paraxial intersectional width for an object of infinite distance, based on a ray near the axis, which determines the length of the minor conjugate, e. g. the so called back focal length, is denoted by reference numerical $p_o^1$. The data of the following example are based on a focal length of $1$, while the axial sectional illustration in Figure 2, of an objective embodying the invention is shown for a focal length of f=150 mm., in natural size.

Example

The structural design of objectives embodying the present invention meets the following conditions:

$$0.50\ F < R_1 < 0.70\ F$$
$$1.40\ F < R_2 < 2.00\ F$$
$$0.33\ F < R_3 < 0.50\ F$$
$$0.70\ F < R_4, R_4' < 1.40\ F$$
$$0.20\ F < R_5 < 0.30\ F$$
$$0.24\ F < -R_6 < 0.33\ F$$
$$0.70\ F < R_7, R_7' < 1.40\ F$$
$$0.33\ F < -R_8 < 0.50\ F$$
$$2\ F < \pm R_9 < \infty$$
$$0.66\ F < -R_{10} < 0.90\ F$$

wherein F is the equivalent focal length of the total objective.

Furthermore $$1.658 < n_1 < 1.738$$
$$1.658 < n_2 < 1.738$$
$$1.658 < n_3 < 1.738$$
$$1.585 < n_4 < 1.625$$
$$1.638 < n_5 < 1.698$$
$$1.67\ < n_6 < 1.75$$

[f=1.0    1:2    $P_o'$=0.71436]

| | | | |
|---|---|---|---|
| $R_1$ =+ 0.58950 | $d_1$=0.07516 | | $n_1$=1.67125 | $\nu_1$=47.1 |
| $R_2$ =+ 1.69657 | $a_1$=0.00236 | | air | |
| $R_3$ =+ 0.38554 | $d_2$=0.08053 | | $n_2$=1.67125 | $\nu_2$=47.1 |
| $R_4$ =$R_4'$=+0.81537 | $d_3$=0.06550 | | $n_3$=1.69842 | $\nu_3$=30.1 |
| $R_5$ =+ 0.25502 | $a_2$=0.20412 | $b_1$=0.10931 $b_2$=0.09481 | diaphragm space | |
| $R_6$ =− 0.28992 | $d_4$=0.02362 | | $n_4$=1.60266 | $\nu_4$=38.4 |
| $R_7$ =$R_7'$=+0.81537 | $d_5$=0.12134 | | $n_5$=1.65953 | $\nu_5$=57.0 |
| $R_8$ =− 0.40771 | $a_3$=0.00376 | | air | |
| $R_9$ =+ 8.74182 | $d_6$=0.06443 | | $n_6$=1.71740 | $\nu_6$=48.1 |
| $R_{10}$ =− 0.79459 | | | | |

Thus, the sum of refractive indices of all collective lenses is:

$$n_1 = 1.67125$$
$$n_2 = 1.67125$$
$$n_5 = 1.65953$$
$$n_6 = 1.71740$$
$$\overline{n_1+n_2+n_5+n_6 = 6.71943}$$

and the arithmetical mean of these indices is 6.71943 : 4=1.6798575, i. e. clearly higher than 1.66.

Furthermore, $n_4$=1.60266 is distinctly smaller than 1.63 and, simultaneously, $n_4$ is by 0.0771975 (i. e. distinctly more than 0.050) smaller than the beforementioned arithmetical mean of all collective lenses, i. e. 1.6798575.

The individual increases of the refractive indices in the rear half of the objective are:

$$n_5 - n_4 = 1.65953 - 1.60266 = 0.05687$$
$$n_6 - n_5 = 1.71740 - 1.65953 = 0.05787$$

i. e. in each case distinctly greater than 0.0375. Furthermore, $$R_8 = 0.40771$$
$$R_{10} = 0.79459$$
$$\overline{R_8 + R_{10} = 1.20230}$$

The length of the front radius $R_1$ is 0.58950 and 180% of this figure is 1.06110; thus, the sum $R_8+R_{10}$=1.20230 is distinctly greater than 1.06110. $R_1$=0.58950 and 280% of this figure is 1.65060. Thus, the sum $R_8+R_{10}$=1.20230 is distinctly smaller than 1.65060.

The term "outer lens surface" is used in the present specification and claims to denote lens surfaces turned away from the centrally arranged diaphragm, such as the lens surfaces having the radii $R_8$ and $R_{10}$ on the side of the minor conjugate and lens surface having the radius $R_1$ on the side of the major conjugate.

It will be understood that this invention is not limited to the specific materials, figures, etc. and other details described above and illustrated in the drawings and can be carried out with various modifications without departing from the scope of the invention, as defined in the appended claims.

What is claimed is:

1. Photographic objective comprising four lens members separated by air spaces, two of these members being arranged on each side of a centrally located diaphragm; said diaphragm being enclosed by two strongly curved concave surfaces, relative to the diaphragm; each of the two lens members enclosing said diaphragm, being composed of two individual lens elements of opposite power, while two outer lens members of the objective consist of single lens elements of distinctly positive refractive power; the arithmetical mean of the mean refractive indices of all collective lenses of the objective being distinctly higher than 1.66; the diverging lens element adjacent to the diaphragm on the side of the minor conjugate being arranged at the point of strongest constriction of rays, with reference to parallel auxiliary ray and consisting of a glass, the mean refractive index for yellow light of which is distinctly smaller than 1.63, and, simultaneously, is smaller by distinctly more than 0.050 than said arithmetical mean of refractive indices of all collective lenses, for light of the same color; the refractive indices of the glasses of the lenses arranged on the side of the minor conjugate increasing in the direction of the light in such manner that the increase of the refractive index, for yellow light, from one individual lens element to the other, is in each case distinctly higher than 0.0375, said photographic objective meeting the following conditions:

$0.50\ F < R_1, < 0.70\ F$
$1.40\ F < R_2 < 2.00\ F$
$0.33\ F < R_3 < 0.50\ F$
$0.70\ F < R_4, R_4' < 1.40\ F$
$0.20\ F < R_5 < 0.30\ F$
$0.24\ F < -R_6 < 0.33\ F$
$0.70\ F < R_7, R_7' < 1.40\ F$
$0.33\ F < -R_8 < 0.50\ F$
$2\ F < \pm R_9 < \infty$
$0.66\ F < -R_{10} < 0.90\ F$ wherein $R_1, R_2, R_3, R_4, R_4', R_5, R_6, R_7, R_8, R_9, R_{10}$ are the radii of curvature of lens surfaces forming the objective, in the direction of the light, and F is the equivalent focal length of the total objective.

2. Photographic objective comprising four lens members separated by air spaces, two of these members being arranged on each side of a centrally located diaphragm; said diaphragm being enclosed by two strongly curved concave surfaces, relative to the diaphragm; each of the two lens members enclosing said diaphragm, being composed of two individual lens elements of opposite power, while two outer lens members of the objective consist of single lens elements of distinctly positive refractive power; the arithmetical mean of the mean refractive indices of all collective lenses of the objective being distinctly higher than 1.66; the diverging lens element adjacent to the diaphragm on the side of the minor conjugate being arranged at the point of strongest constriction of rays, with reference to parallel auxiliary ray and consisting of a glass, the mean refractive index for yellow light of which is distinctly smaller than 1.63, and, simultaneously, is smaller by distinctly more than 0.050 than said arithmetical mean of refractive indices of all collective lenses, for light of the same color; the refractive indices of the glasses of the lenses arranged on the side of the minor conjugate increasing in the direction of the light in such manner that the increase of the refractive index, for yellow light, from one individual lens element to the other, is in each case distinctly higher than 0.0375, said photographic objective meeting the following conditions:

$0.50\ F < R_1 < 0.70\ F$
$1.40\ F < R_2 < 2.00\ F$
$0.33\ F < R_3 < 0.50\ F$
$0.70\ F < R_4, R_4', < 1.40\ F$
$0.20\ F < R_5 < 0.30\ F$
$0.24\ F < -R_6 < 0.33\ F$
$0.70\ F < R_7, R_7' < 1.40\ F$
$0.33\ F < -R_8 < 0.50\ F$
$2\ F < \pm R_9 < \infty$
$0.66\ F < -R_{10} < 0.90\ F$ wherein $R_1, R_2, R_3, R_4, R_4', R_5, R_6, R_7, R_7', R_8, R_9, R_{10}$ are the radii of curvature of lens surfaces forming the objective in the direction of the light, and F is the equivalent focal length of the total objective, $1.658 < n_1 < 1.738$
$1.658 < n_2 < 1.738$
$1.658 < n_3 < 1.738$
$1.585 < n_4 < 1.625$
$1.638 < n_5 < 1.698$
$1.67 < n_6 < 1.75$ wherein $n_1, n_2, n_3, n_4, n_5, n_6$, are the refractive indices of the lenses forming the objective in the direction of light, stated for the blue light of helium line $d$ of a wave length of 5876 AE.

3. Photographic objective comprising four lens members separated by air spaces, two of these members being arranged on each side of a centrally located diaphragm; said diaphragm being enclosed by two strongly curved concave surfaces, relative to the diaphragm; each of the two lens members enclosing said diaphragm, being composed of two individual lens elements of opposite power, while two outer lens members of the objective consist of single lens elements of distinctly positive refractive power; the arithmetical mean of the mean refractive indices of all collective lenses of the objective being distinctly higher than 1.66; the diverging lens element adjacent to the diaphragm on the side of the minor conjugate being arranged at the point of strongest constriction of rays, with reference to parallel auxiliary ray and consisting of a glass, the mean refractive index for yellow light of which is distinctly smaller than 1.63, and, simultaneously, is smaller by distinctly more than 0.050 than said arithmetical mean of refractive indices of all collective lenses, for light of the same color; the refractive indices of the glasses of the lenses arranged on the side of the minor conjugate increasing in the direction of the light in such manner that the increase of the refractive index, for yellow light, from one individual lens element to the other, is in each case distinctly higher than 0.0375, said photographic objective meeting the following conditions:

$0.50\ F < R_1 < 0.70\ F$
$1.40\ F < R_2 < 2.00\ F$
$0.33\ F < R_3 < 0.50\ F$
$0.70\ F < R_4, R_4' < 1.40\ F$
$0.20\ F < R_5 < 0.30\ F$
$0.24\ F < -R_6 < 0.33\ F$
$0.70\ F < R_7, R_7' < 1.40\ F$
$0.33\ F < -R_8 < 0.50\ F$
$2\ F < \pm R_9 < \infty$
$0.66\ F < -R_{10} < 0.90\ F$ wherein $R_1, R_2, R_3, R_4, R_4', R_5, R_6, R_7, R_7', R_8, R_9, R_{10}$ are the radii of curvature of lens surfaces forming the objective, in the direction of the light, and F is the equivalent focal length of the total objective, and $$\frac{180}{100} \cdot R_1 < (R_8 + R_{10}) < \frac{280}{100} \cdot R_1$$

4. Photographic objective comprising four lens members separated by air spaces, two of these members being arranged on each side of a centrally located diaphragm; said diaphragm being enclosed by two strongly curved concave surfaces, relative to the diaphragm; each of the two lens members enclosing said diaphragm, being composed of two individual lens elements of opposite power, while two outer lens members of the objective consist of single lens elements of distinctly positive refractive power; the arithmetical mean of the mean refractive indices of all collective lenses of the objective being distinctly higher than 1.66; the diverging lens element adjacent to the diaphragm on the side of the minor conjugate being arranged at the point of strongest constriction of rays, with reference to parallel auxiliary ray and consisting of a glass, the mean refractive index for yellow light of which is distinctly smaller than 1.63, and, simultaneously, is smaller by distinctly more than 0.050 than said arithmetical mean of refractive indices of all collective lenses, for light of the same color; the refractive indices of the glasses of the lenses arranged on the side of the minor conjugate increasing in the direction of the light in such manner that the increase of the refractive index, for yellow light, from one individual lens element to the other, is in each case distinctly higher than 0.0375, said photographic objective meeting the following conditions:

$$0.50\ F < R_1 < 0.70\ F$$
$$1.40\ F < R_2 < 2.00\ F$$
$$0.33\ F < R_3 < 0.50\ F$$
$$0.70\ F < R_4, R_4' < 1.40\ F$$
$$0.20\ F < R_5 < 0.30\ F$$
$$0.24\ F < -R_6 < 0.33\ F$$
$$0.70\ F < R_7, R_7' < 1.40\ F$$
$$0.33\ F < -R_8 < 0.50\ F$$
$$2\ F < \pm R_9 < \infty$$
$$0.66\ F < -R_{10} < 0.90\ F$$

wherein $R_1$, $R_2$, $R_3$, $R_4$, $R_4'$, $R_5$, $R_6$, $R_7$, $R_7'$, $R_8$, $R_9$, $R_{10}$ are the radii of curvature of lens surfaces forming the objective, in the direction of the light, and F is the equivalent focal length of the total objective, and $$\frac{180}{100} \cdot R_1 < (R_8 + R_{10}) < \frac{280}{100} \cdot R_1$$

$$1.658 < n_1 < 1.738$$
$$1.658 < n_2 < 1.738$$
$$1.658 < n_3 < 1.738$$
$$1.585 < n_4 < 1.625$$
$$1.638 < n_5 < 1.698$$
$$1.67 < n_6 < 1.75$$

wherein $n_1$, $n_2$, $n_3$, $n_4$, $n_5$, $n_6$, are the refractive indices of the lenses forming the objective in the direction of light, stated for the blue light of helium line $d$ of a wave length of 5876 AE.

ALBRECHT WILHELM TRONNIER.

References Cited in the file of this patent

UNITED STATES PATENTS

| Number | Name | Date |
|---|---|---|
| 1,955,591 | Lee | Apr. 17, 1934 |
| 2,117,252 | Lee | May 10, 1938 |
| 2,194,413 | Warmisham et al. | Mar. 19, 1940 |
| 2,532,752 | Baker | Dec. 5, 1950 |

FOREIGN PATENTS

| Number | Country | Date |
|---|---|---|
| 428,657 | Germany | May 10, 1926 |
| 439,556 | Germany | Jan. 13, 1927 |
| 427,008 | Great Britain | Apr. 12, 1935 |
| 481,710 | Great Britain | Mar. 16, 1938 |
| 665,520 | Germany | Sept. 27, 1938 |